United States Patent
Queck et al.

(10) Patent No.: US 9,849,659 B2
(45) Date of Patent: Dec. 26, 2017

(54) MASKING REMOVAL SYSTEM AND METHOD

(71) Applicant: Cardinal IG Company, Eden Prairie, MN (US)

(72) Inventors: Curtis Lee Queck, Spring Green, WI (US); Robert Casper Buchanan, Spring Green, WI (US); Michael John Milewski, Poynette, WI (US); Jacobus P. Pretorius, Lone Rock, WI (US)

(73) Assignee: Cardinal IG Company, Eden Prairie, MN (US)

( * ) Notice: Subject to any disclaimer, the term of this patent is extended or adjusted under 35 U.S.C. 154(b) by 58 days.

(21) Appl. No.: 14/735,488

(22) Filed: Jun. 10, 2015

(65) Prior Publication Data
US 2016/0361912 A1    Dec. 15, 2016

(51) Int. Cl.
*B32B 43/00*    (2006.01)
*B32B 38/18*    (2006.01)

(52) U.S. Cl.
CPC ........ *B32B 43/006* (2013.01); *B32B 38/1858* (2013.01); *B32B 2607/00* (2013.01); *Y10T 83/808* (2015.04); *Y10T 156/1132* (2015.01); *Y10T 156/1137* (2015.01); *Y10T 156/1168* (2015.01); *Y10T 156/1933* (2015.01); *Y10T 156/1944* (2015.01); *Y10T 156/1961* (2015.01); *Y10T 156/1967* (2015.01)

(58) Field of Classification Search
None
See application file for complete search history.

(56) References Cited

U.S. PATENT DOCUMENTS

| | | |
|---|---|---|
| 4,087,312 A | 5/1978 | Maltese |
| 5,020,288 A | 6/1991 | Swensen |
| 5,599,422 A | 2/1997 | Adams, Jr. et al. |
| 6,793,971 B2 | 9/2004 | Trpkovski |
| 6,973,759 B2 | 12/2005 | Trpkovski |
| 7,025,850 B2 | 4/2006 | Trpkovski |
| 7,026,571 B2 | 4/2006 | Larsen |
| 7,083,699 B2 | 8/2006 | Trpkovski |
| 7,165,591 B2 | 1/2007 | Trpkovski |
| 9,186,876 B1 | 11/2015 | Queck et al. |
| 2003/0041533 A1 | 3/2003 | Trpkovski |
| 2009/0255627 A1 | 10/2009 | Queck et al. |
| 2010/0210186 A1* | 8/2010 | Panuska .......... B24C 1/045 451/38 |

FOREIGN PATENT DOCUMENTS

| | | |
|---|---|---|
| CN | 203513501 U | 4/2014 |
| DE | 3435143 A1 | 6/1986 |
| EP | 0695623 A2 | 2/1996 |

* cited by examiner

*Primary Examiner* — Linda L Gray
(74) *Attorney, Agent, or Firm* — Fredrikson & Byron, P.A.

(57) ABSTRACT

The invention provides machines for removing strips of masking from glazing panes. Also provided are methods of removing strips of masking from glazing panes. One embodiment of a machine for removing strips of masking material from a glazing pane includes a cutting head and a processing station. The processing station can be constructed to retain the glazing pane in a processing position with a first surface of the glazing pane oriented toward the cutting head. The cutting head can be movable in various directions across the masked glazing pane and include cutters to cut strips from the masking material.

36 Claims, 11 Drawing Sheets

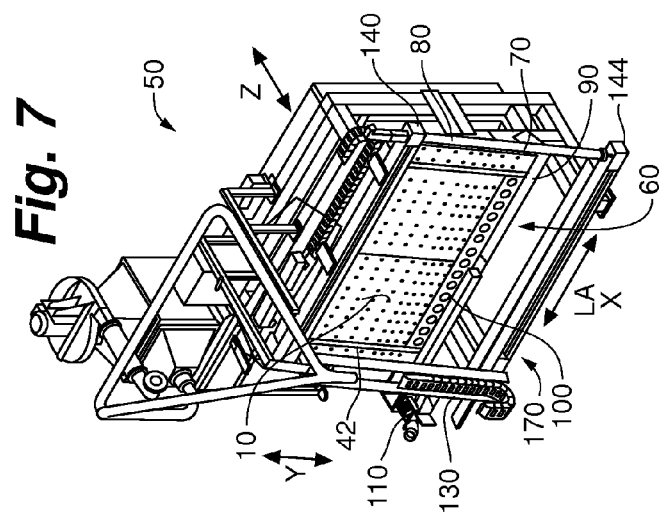
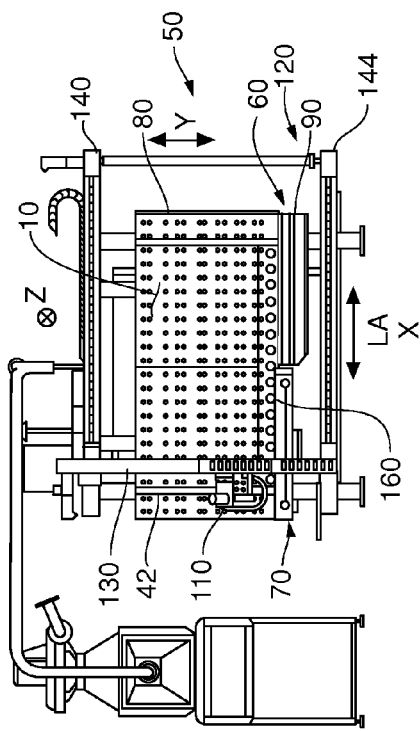

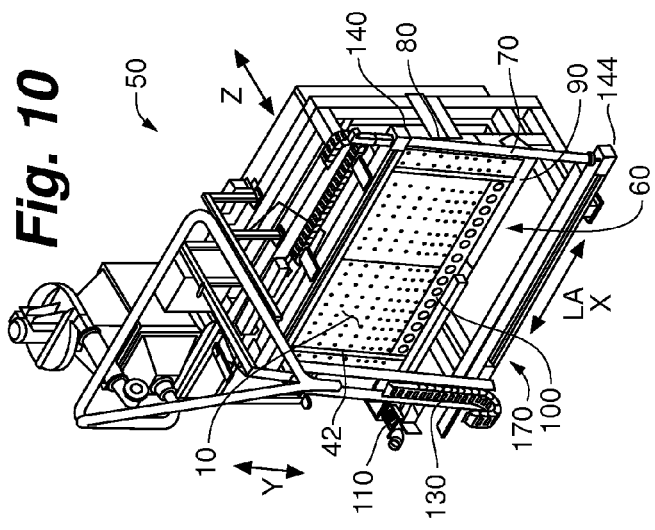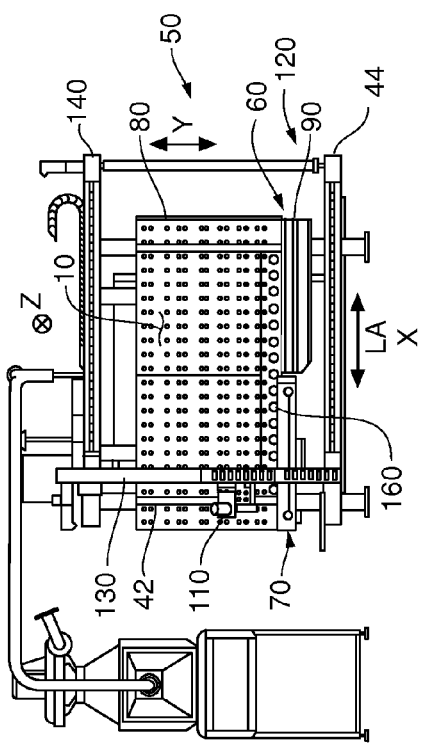

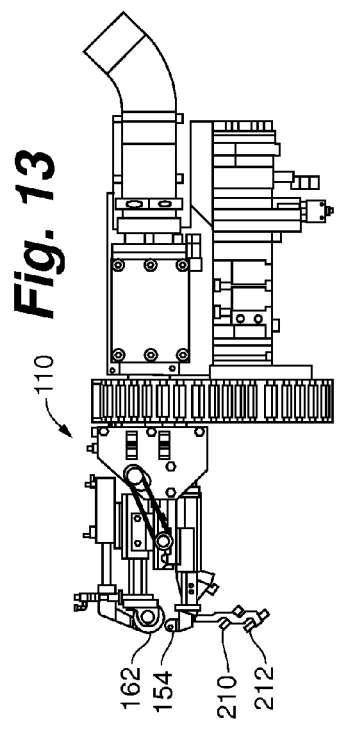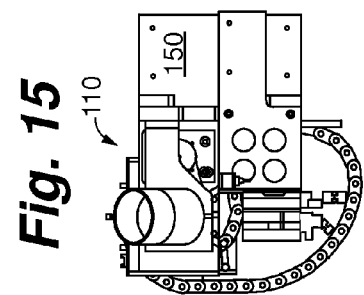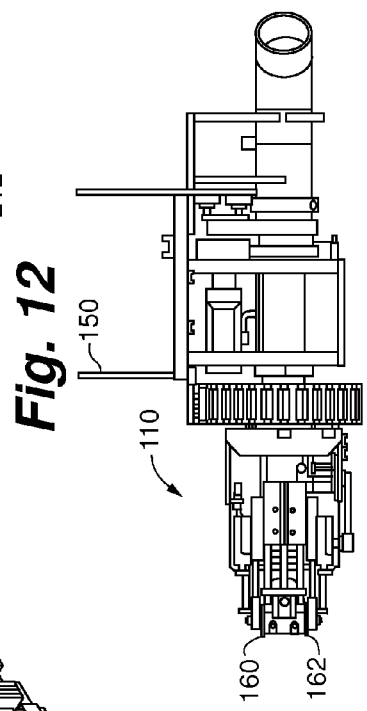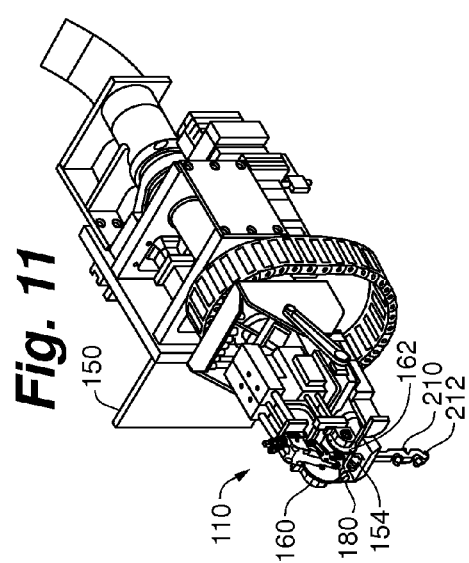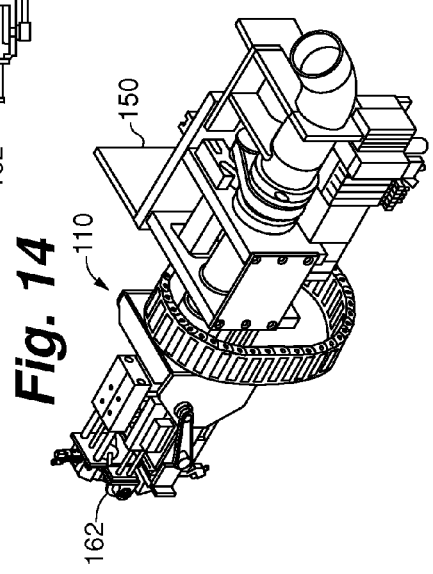

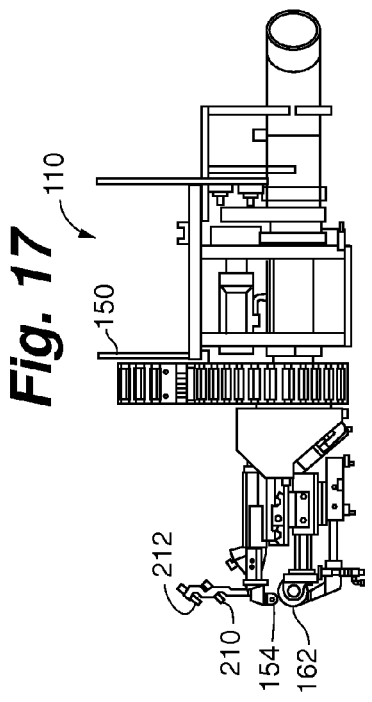
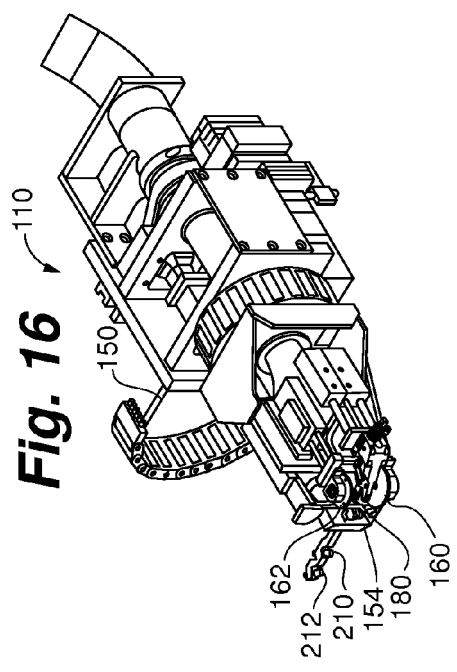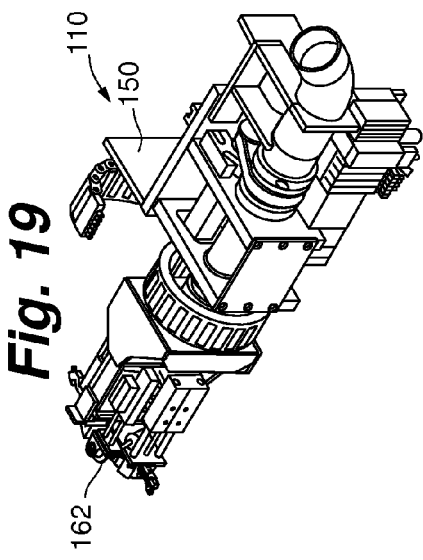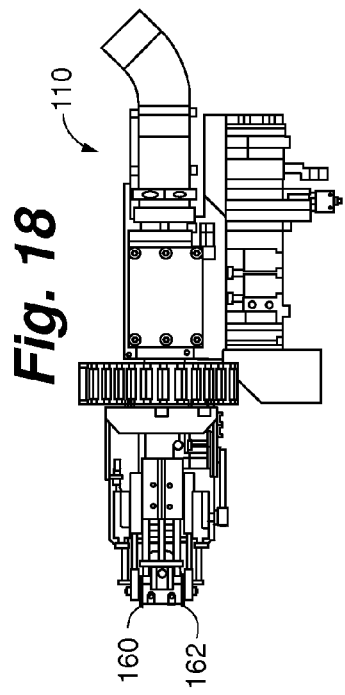
Fig. 16
Fig. 17
Fig. 18
Fig. 19

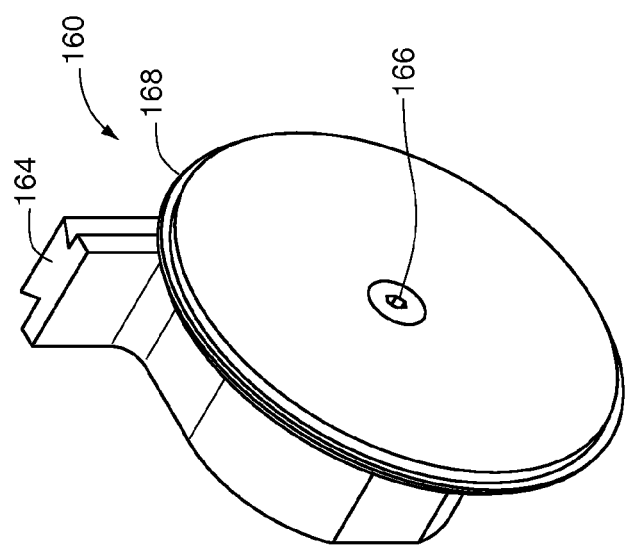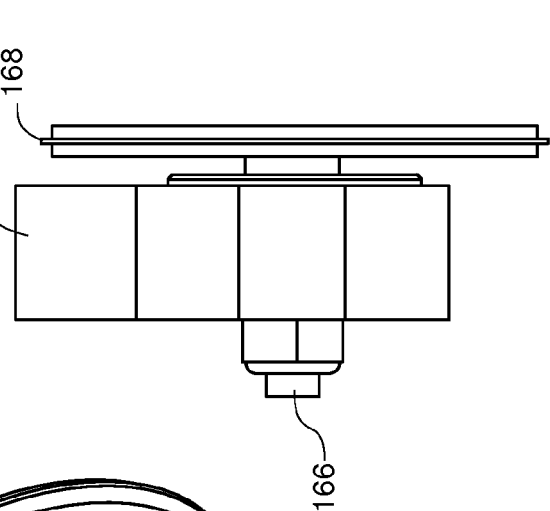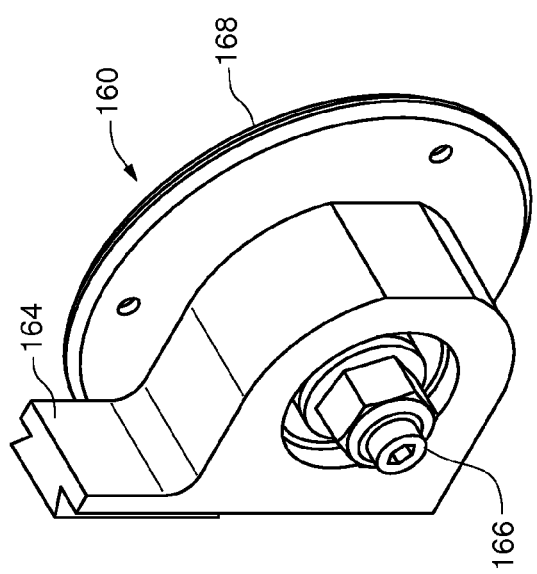

MASKING REMOVAL SYSTEM AND METHOD

FIELD OF THE INVENTION

The present invention relates to removing strips of masking from masked glazing panes. In particular, this invention relates to machines and processes used to remove strips of removable masking from such panes.

BACKGROUND OF THE INVENTION

In most industrialized countries, windows touch people's lives every day. Where ever people work and live there are windows. Windows allow the occupants of a building to view the outside world, while allowing sun light to enter the interior of the building. Sunlight is a natural antidepressant and helps the human body produce vitamin D. Thus, a certain amount of sunshine is essential to mental and physical well-being.

In extreme climates, significant energy may be lost through windows during the winter when a building is being heated, and/or during the summer when a building is being cooled. With the high cost of energy, efforts have been made to provide homes and other buildings with insulation that will more efficiently prevent the transfer of heat between the inside and the outside of a building. Multiple-pane insulating glass units ("IGUs") have been developed as an effective way to reduce the amount of heat transfer through windows.

There are basically two types of multiple-pane IGUs in widespread commercial production. These are often referred to as double glazing and triple glazing. Double glazed insulating glass units are the most common. They have a space sealed between two panes. This space provides thermal insulation. The insulating effect can be enhanced by filling the space with an insulative gas mix, e.g., a mix of air and argon or krypton. Alternatively, the space can be evacuated, so as to provide a vacuum IG unit. Compared with a single pane glazing, double glazed IGUs can reduce the heat loss through a window by nearly half. Triple-glazed IGUs (or "triple glazings") can provide even more insulating effect, but are currently less common. They have three panes and two thermal insulation spaces.

Because of the dramatic energy savings that can be achieved with multiple-pane IGUs, building codes in many areas have been revised to require their use. The relative energy performance of these units is an important factor to consider when consumers purchase windows.

The front and rear surfaces of an IGU may be damaged (e.g., scratched) or soiled during storage, handling, transportation to a building site, and/or during the building process (e.g., during installation of the IGU, or during various finishing operations, such as painting, brick washing, etc.). It is therefore desirable to provide removable masking over one or both of the front and rear surfaces of an IGU. Once an IGU has been mounted in its final position and all finishing of the surrounding structures has been completed, the masking can be removed from the IGU to reveal the pristine underlying pane surface.

Further, many IGUs are provided with decorative features that enhance their aesthetic appeal and adapt them to fit within the architectural style of the building in which they are installed. Muntin bars, sometimes referred to as grille bars, are an example of such a feature. The bars can be arranged in a pattern to provide simulated divided glazing panes. The bars can be included within the interior space of an IGU and/or applied to one or more of its exterior surfaces.

It would be desirable to provide masking machines and methods that solve one or more problems attendant in state-of-the-art masking application technology, or that otherwise offer improvements over state-of-the-art masking machines and methods.

BRIEF DESCRIPTION OF THE DRAWINGS

FIG. 5 is a perspective view of a masking removal machine configured to cut and remove vertical strips of masking material in accordance with certain embodiments of the present invention.

FIG. 6 is a front view of a masking removal machine configured to cut and remove vertical strips of masking material in accordance with certain embodiments of the present invention.

FIG. 7 is a perspective view of a masking removal machine configured to cut and remove vertical strips of masking material in accordance with certain embodiments of the present invention.

FIG. 8 is a perspective view of a masking removal machine configured to cut and remove horizontal strips of masking material in accordance with certain embodiments of the present invention.

FIG. 9 is a front view of a masking removal machine configured to cut and remove horizontal strips of masking material in accordance with certain embodiments of the present invention.

FIG. 10 is a perspective view of a masking removal machine configured to cut and remove horizontal strips of masking material in accordance with certain embodiments of the present invention.

FIG. 11 is a perspective view of a masking removal head configured to cut and remove vertical strips of masking material in accordance with certain embodiments of the present invention.

FIG. 12 is a top view of a masking removal head configured to cut and remove vertical strips of masking material in accordance with certain embodiments of the present invention.

FIG. 13 is a side view of a masking removal head configured to cut and remove vertical strips of masking material in accordance with certain embodiments of the present invention.

FIG. 14 is a perspective view of a masking removal head configured to cut and remove vertical strips of masking material in accordance with certain embodiments of the present invention.

FIG. 15 is an end view of a masking removal head configured to cut and remove vertical strips of masking material in accordance with certain embodiments of the present invention.

FIG. 16 is a perspective view of a masking removal head configured to cut and remove horizontal strips of masking material in accordance with certain embodiments of the present invention.

FIG. 17 is a top view of a masking removal head configured to cut and remove horizontal strips of masking material in accordance with certain embodiments of the present invention.

FIG. 18 is a side view of a masking removal head configured to cut and remove horizontal strips of masking material in accordance with certain embodiments of the present invention.

FIG. 19 is a perspective view of a masking removal head configured to cut and remove horizontal strips of masking material in accordance with certain embodiments of the present invention.

FIG. 20 is a perspective view of a cutting wheel in accordance with certain embodiments of the present invention.

FIG. 21 is a front view of a cutting wheel in accordance with certain embodiments of the present invention.

FIG. 22 is a perspective view of a cutting wheel in accordance with certain embodiments of the present invention.

SUMMARY

Figure 1:
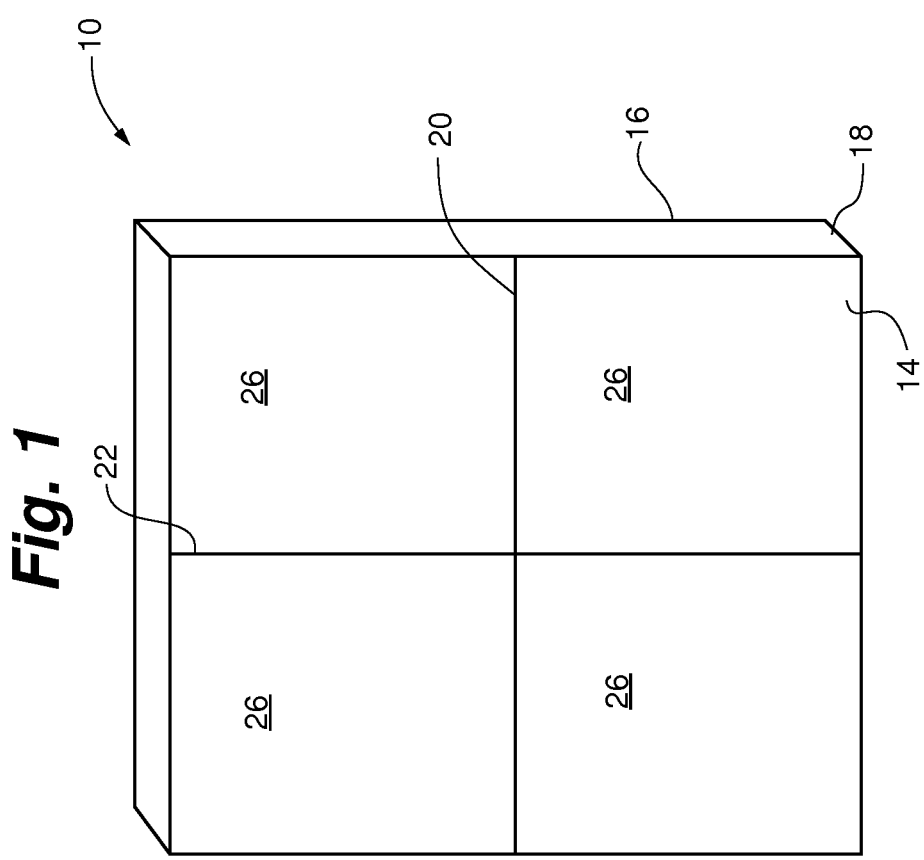
FIG. 1 is a perspective schematic view of a glazing unit with muntin bars to be processed in accordance with certain embodiments of the present invention.

In some embodiments, the invention includes a machine for automated removal of strips of masking film from masked glazing panes. The machine can include a cutting head and a processing station. The cutting head can be movable in various directions across the masked glazing pane and include cutters to cut strips from the masking film in a pattern to accept muntin bars. After processing in the machine, muntin bars can be applied to the masked glazing pane in alignment with the cut out strips such that the muntin bars do not contact the masking material.

Certain embodiments provide an automated method of removing strips of masking film from masked glazing panes using a machine having a movable cutting head. The method includes positioning a glazing pane having opposed first and second surfaces in a processing position wherein the first surface of the glazing pane is oriented toward the cutting head and moving the cutting head along the first surface of the glazing pane such that the cutting head make cuts in a masking film on the first surface of the glazing pane to thereby cut a strip from the masking film.

DETAILED DESCRIPTION

The following detailed description is to be read with reference to the drawings, in which like elements in different drawings have like reference numerals. The drawings, which are not necessarily to scale, depict selected embodiments and are not intended to limit the scope of the invention Skilled artisans will recognize that the examples provided herein have many useful alternatives that fall within the scope of the invention.

The present invention provides a machine configured to perform automated removal of strips of masking material (e.g., masking film) from glazing panes having at least one surface carrying a protective mask. A schematic representation of a glazing pane is provided in FIG. 1. As shown in FIG. 1, the glazing pane 10 can be a monolithic pane or a multiple-pane insulating glazing unit (e.g., a double or triple glazed IGU). The glazing pane 10 will typically comprise one or more glass panes. Panes of various thicknesses can be used in (or as) the glazing pane 10. Generally, the glazing pane 10 will comprise a first surface 14 and a second surface 16 separated by a spacer 18, each of the surfaces (optionally formed of glass) having a thickness of from 1-12 mm. In some cases, the pane or panes each have a thickness of from 2 to 5 mm, such as from 2.3 to 4.8 mm, or from 2.5 to 4.8 mm. In one example, a sheet of glass (e.g., soda-lime glass) having a thickness of about 3 mm is used. Each sheet can have a substantially rectangular form factor and can include a top edge, a bottom edge opposite the top edge, a first side edge, and a second side edge opposite the first side edge. Alternatively, if desired, the glazing pane 10 can alternatively comprise one or more polymer sheets. The surfaces may carry one or more coatings, and, in certain embodiments, the space between the surfaces is filled with inert gas, such as argon.

The glazing pane 10 in FIG. 1 also includes muntin bars 20, 22 arranged in a pattern to provide simulated divided glazing panes 26. In the example of FIG. 1, the bars are applied to an exterior surface of the first surface 14 of the glazing pane 10 and are arranged in an intersecting pattern to form a repeating rectangle pattern across the surface. The bars are depicted schematically in FIG. 1 as lines, however such bars can have a thickness and a depth. For example the bars may have a thickness of between about 0.5 inches and less than about 2 inches (e.g., less than about 15/8 inches. Also in the example shown in FIG. 1, a single horizontal bar 20 and a single vertical bar 22 are depicted, such that the glazing pane is divided into four simulated divided glazing panes 26. Additional bars could be provided to simulate any desired number of divided glazing panes. For example, two horizontal bars and two vertical bars could be provided such that the glazing pane is divided into 9 simulated divided glazing panes. As another example, three horizontal bars and three vertical bars could be provided such that the glazing pane is divided into 16 simulated divided glazing panes. Other types of patterns, such as a diamond pattern, may also be desirable.

Figure 2:
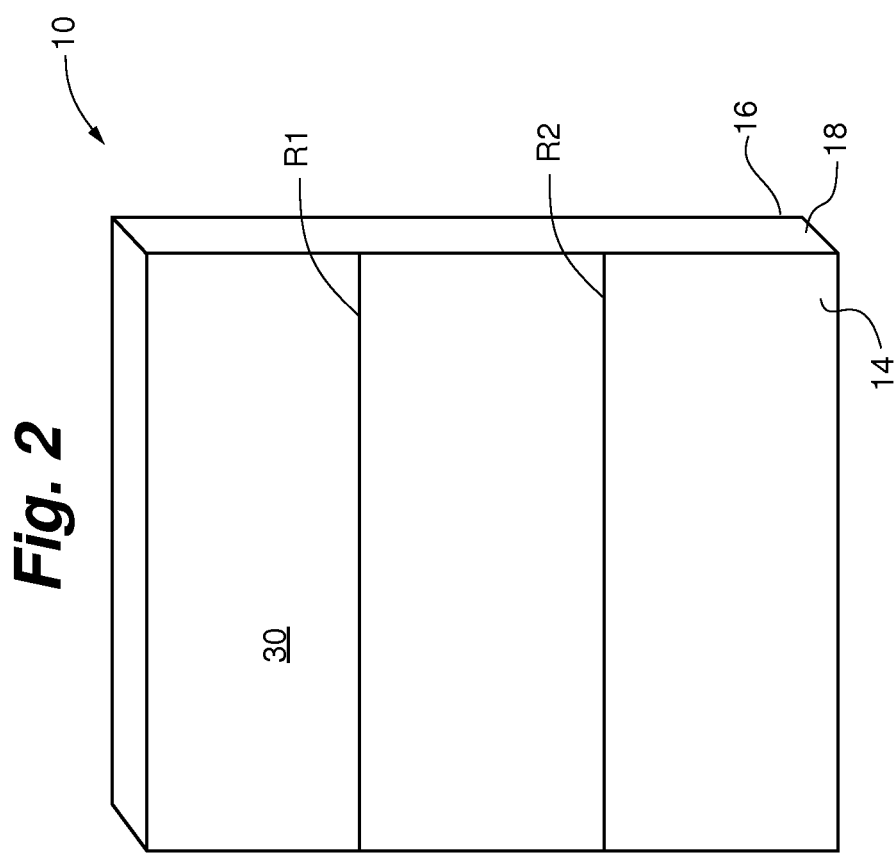
FIG. 2 is a perspective schematic view of a masked glazing unit to be processed in accordance with certain embodiments of the present invention.

FIG. 2 shows a glazing pane 10 with a protective masking 30. The protective masking can be applied to cover substantially all, such as all of an interior region, of at least one surface of the glazing pane. In the embodiment of FIG. 2, the masking has been applied before the muntin bars and covers all of an interior region of the first surface 14. The masking material may include a plurality of sequentially overlapped strips of masking material or a single piece of masking material to cover the entire masked area of the front surface 14 of each glazing pane 10. In the example of FIG. 2, the glazing pane has been masked using three sheets of masking material overlapping at two regions, R1 and R2. In some embodiments, the strips overlap between about 0.5 inches and 1 inch (e.g., about 7/16 of an inch).

The masking material may be of any type, including a polymeric sheet with an adhesive to adhere the sheet to the surface of the glazing pane. In some embodiments, the masking comprises a polymer masking film having a pressure-sensitive adhesive on one side (i.e., on its first face, facing towards the glazing pane), with no adhesive on the other side (i.e., on its second face, facing away from the glazing pane). The thickness of the masking film can be, for example, between about 0.0005 inch and about 0.01 inch, such as between about 0.001 inch and about 0.005 inch. In one example, the thickness of the masking film is about 0.003 inch (e.g., 0.0032 inches thick). In a specific example, the masking film is formed of a polyethylene film (e.g., medium-density polyethylene) with a thickness of about 0.003 inch and having an acrylic adhesive on its first face. Protective film of this nature is commercially available from Poli-Film America Inc. of Hampshire, Ill. U.S.A. In some embodiments, the masking material can have a peel adhesion of between about 0.5 and about 5 ounces per lineal inch (e.g., between about 1 and about 3 ounces per linear inch).

Figure 3:
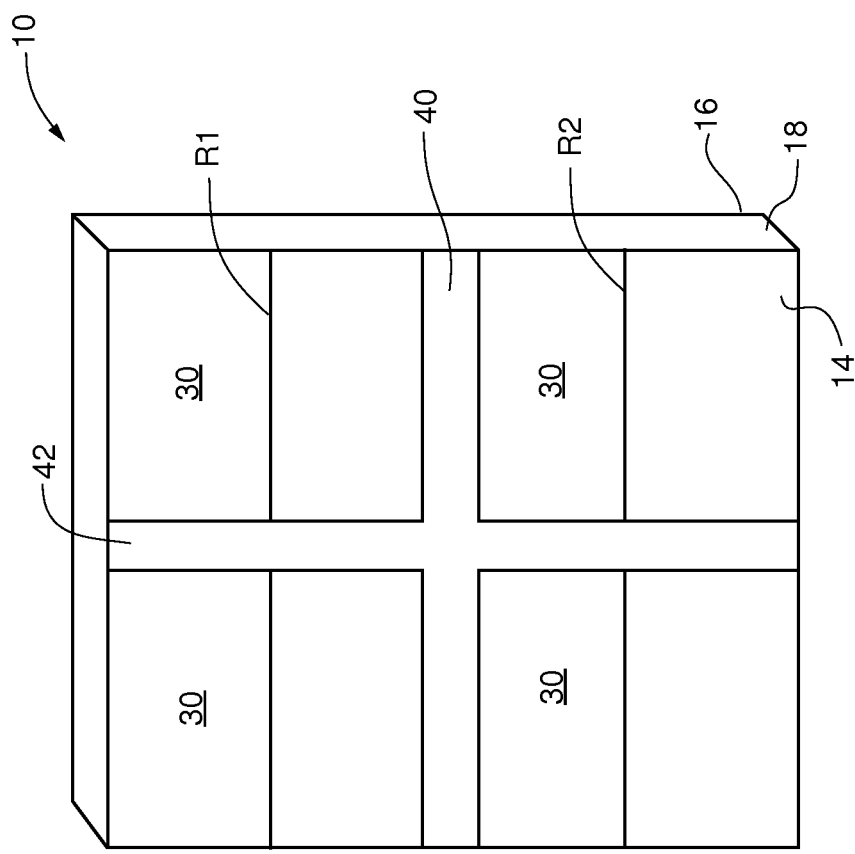
FIG. 3 is a perspective schematic view of a masked glazing unit processed in accordance with certain embodiments of the present invention.
Figure 4:
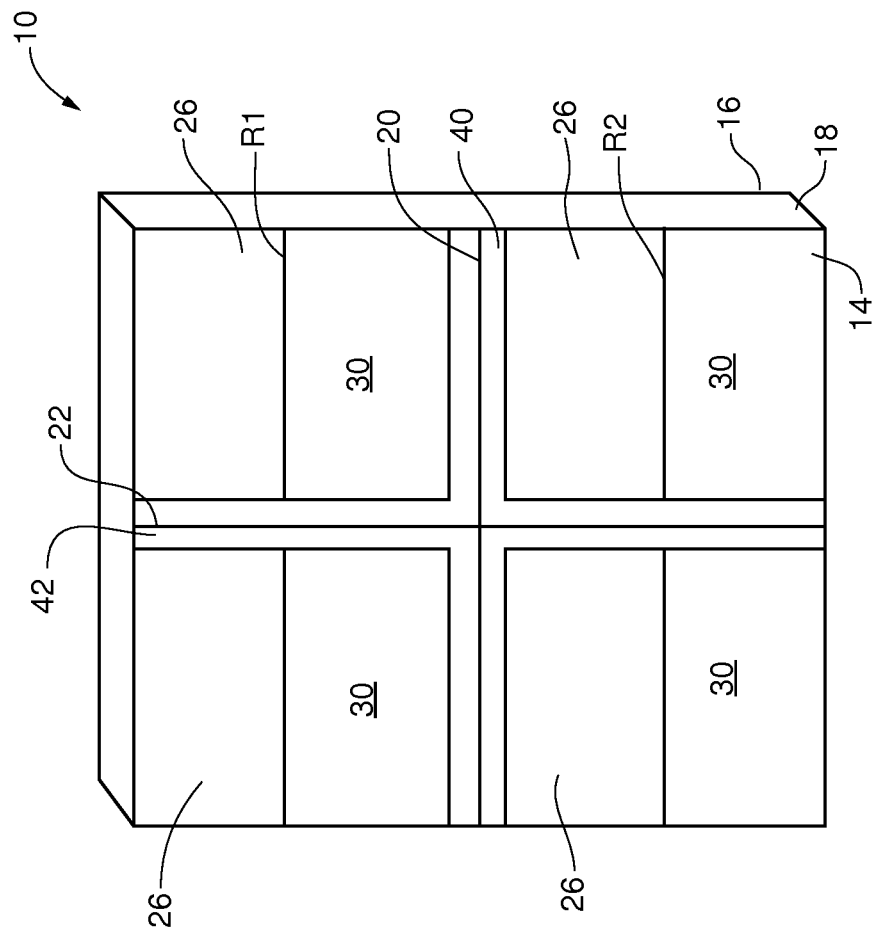
FIG. 4 is a perspective schematic view of a masked glazing unit with muntin bars processed in accordance with certain embodiments of the present invention.

FIG. 3 shows a masked glazing pane 10 with strips of the masking 30 removed according to the present disclosure to reveal unmasked strips 40, 42 on the first surface 14. In this example, the strips are arranged in an intersecting pattern to form a repeating rectangle pattern across the surface. As such, the masked pane 10 is prepared to have muntin bars installed on the surface within the unmasked strips 40, 42. FIG. 4 shows a masked glazing pane 10 with muntin bars 20, 22 placed within the unmasked strips, 40, 42, respectively. The muntin bars are aligned with the strips such that they are in apposition to the surface of the surface 14 without masking material between the bars and the surface. The regions of the surface that are not covered by muntin bars 22, 24 retain their protective masking 30, which can be removed in the normal course after the glazing pane 10 has been, for example, installed in a building.

FIG. 5 depicts an exemplary embodiment of a machine 50 adapted to remove strips of masking from a masked glazing pane 10 prior to the installation of muntin bars. The machine 50 has a processing (e.g., masking strip removal) station 60 constructed to receive a masked glazing pane 10. The pane 10 can be provided at the masking removal station of the machine 10 such that the masked front surface 14 is ready to have strips of its masking removed. For convenience, this disclosure will describe the masking removal process with respect to the front surface 14. However, strips of masking material could be removed from both the front and rear surfaces, or the pane could include only one surface.

FIG. 5 depicts an embodiment of the machine 50 wherein glazing panes 10 are conveyed and processed in an upright (e.g., generally vertical) position. The machine, however, can alternatively be embodied such that the glazing panes are conveyed and processed in a generally horizontal position. The machine 50 preferably has a surface transport system 70. In the embodiment illustrated, the transport system 70 is adapted for maintaining a glazing pane 10 in a vertical-offset configuration wherein the pane is not in a perfectly vertical position but rather is offset from vertical by an acute angle. This angle can be less than 15 degrees, and perhaps preferably less than 10 degrees. In some cases, the angle is between 5 degrees and 10 degrees. In one example, the angle is about 7 degrees. In the embodiment illustrated, the angle is offset from vertical such that the glazing pane 10 is conveyed and masked in a "leaned back" configuration. In this configuration, a top edge of the glazing pane 10 is slightly closer (along the Z axis to the rear of the machine) than is the bottom edge of the pane.

In the embodiment of FIG. 5, the transport system 70 defines a path of surface travel extending along a lateral axis LA of the machine 50. Preferably, the path of surface travel extends between a machine inlet and a machine outlet. In some cases, an optional upstream conveyor is configured to deliver masked glazing panes from an upstream series of masking machines to the machine (e.g., via the machine inlet), and/or an optional downstream conveyor is configured to deliver masked glazing panes with strips of masking removed from the machine (e.g., via the machine outlet).

The illustrated transport system 70 is adapted for moving (e.g., conveying) the glazing pane 10 along the path of surface travel while maintaining the pane in a vertical-offset configuration. Thus, the transport system 70 can include a rear support 80 and a bottom conveyor 90.

When a glazing pane 10 is conveyed along the transport system 70, the pane's rear surface is supported by (optionally by being in direct physical contact with) the rear support 80. The rear support 80 can be provided in different forms. For example, it can comprise a platen, framework, or both. FIG. 5 exemplifies a preferred embodiment wherein the rear support 80 comprises a platen. Here, the platen defines a front surface alongside which the glazing pane can be carried (e.g., against which the pane can slide) during conveyance of the pane. When provided, the platen can advantageously have a flat (e.g., planar) front surface with an area sufficient to accommodate glazing panes of various sizes, and the platen can have a rear surface adapted to slide or roll along the transport system.

If desired, the rear support 80 (whether comprising a platen, a framework, or both) can comprise a plurality of rotatable bodies adapted to roll against the pane's rear surface when the pane 10 is conveyed along the path of surface travel. When provided, such rotatable bodies may be mounted in a fixed positions relative to (e.g., on) the rear support 80. Each such rotatable body can optionally be mounted in a fixed location where it is adapted to rotate about a generally vertical axis. Thus, the rear support 80 can optionally comprise a plurality of rotatable wheels. Additionally or alternatively, the rear support 80 can comprise a plurality of casters, which are free to rotate in any direction. Such wheels and/or casters can be provided as an arrangement (e.g., a matrix) wherein they are spaced vertically and horizontally from one another. When provided, the wheels are oriented so their direction of rotation corresponds to the desired direction of surface travel (e.g., such wheels preferably are adapted for rotation about a common axis). Another option is to provide the rear support 80 with an air cushion (e.g., a plurality of nozzles providing an air cushion) for supporting the rear surface of the glazing pane 10 during conveyance. In the illustrated embodiment, though, the flat front surface is devoid of wheels, casters, and air nozzles adapted to provide an air cushion.

The machine 50 can optionally include an automated sensor that detects the presence of the glazing pane 10 at a position on the lateral axis LA of the machine. In such cases, the conveyor 90 is operable to move the glazing pane along the lateral axis LA of the machine 50 until the glazing pane moves to the position where a leading or trailing edge of the glazing pane can be detected by the sensor. At this time (or at a desired number of seconds thereafter), the conveyor can be stopped, thereby positioning the glazing pane in a desired position at the masking removal station. If desired, the sensor can be on the platen. Instead of having one or more sensors of this nature, the machine can include a physical stop (e.g., a bar, shoulder, or other body) that moves into the pane's path of travel such that the pane strikes the physical stop, and is thereby held in place, upon reaching the desired position.

The rear support 80 preferably includes at least one suction mechanism 100 (each optionally comprising a suction cup). In the embodiment shown, the platen has a series of suction mechanisms 100 located along the lateral axis LA. Each of the illustrated suction mechanisms 100 comprises an opening in the front surface of the platen 80. The suction mechanisms 100 are adapted to engage the rear surface of the glazing pane 10 by applying suction to this surface, so as to retain the pane in a stationary position while masking strips are removed from the pane. To accommodate different size glazing panes, and/or to enable glazing panes to be processed at different locations on the conveyor 90, the suction mechanisms 100 can advantageously be spaced along at least 50% of the width (as measured along lateral axis LA) of the platen. In the embodiment shown, the suction mechanisms 100 are located adjacent to the conveyor 90, i.e., in a bottom edge region of the rear support 80.

In some embodiments, the machine 50 includes a processing station 60 constructed to retain a masked glazing pane 10 having opposed first and second surfaces in a processing position wherein the first surface of the glazing pane is oriented toward a cutting head 110. The cutting head 100 can be movable in an X direction and in a Y direction, which can be offset from each other by an angle of 90 degrees at least when viewed from the front of the machine as shown in FIGS. 6 and 9. In some embodiments, the Y direction is generally vertical and the X direction is generally horizontal, such that the cutting head can remove a series of vertical strips and a series of horizontal strips of masking material from the glazing pane. In the embodiment shown, the Y direction is offset from vertical the same amount as the transport system 70 is adapted to maintain the glazing pane. This angle can be less than 15 degrees, and perhaps preferably less than 10 degrees. In some cases, the angle is between 5 degrees and 10 degrees. In one example, the angle is about 7 degrees.

In some embodiments, as shown in FIGS. 5-10, the machine 50 includes a head conveyance frame 120. In the embodiment shown, the machine includes a vertical beam 130 and two horizontal beams 140, 144. The cutting head 110 can be mounted so as to be moveable vertically along the vertical beam 130 to cut strips in the Y direction. Further, the vertical beam 130 can be mounted so as to be moveable horizontally along the two horizontal beams 140, 144 to cut strips in the X direction. This allows the head 110 to be moved relative to the glazing pane 10 to different elevations (e.g., moved vertically), horizontally, or both. In FIGS. 5-7, a single vertical strip of masking material has been cut and removed to reveal vertical unmasked strip 42. The cutting head 110 and vertical beam 130 could be moved along the two horizontal beams 140, 144 and further vertical strips could be cut and removed. It is to be appreciated that, to accommodate a vertical-offset configuration of the nature described above, the vertical beam 130 can be offset slightly from a precisely vertical orientation, such as by the same amount of offset the glazing pane is held by the transport system, as discussed above.

Further, in some embodiments, the head 110 is rotatably mounted to the head conveyance frame 120 (e.g., the vertical beam 130) such that it can rotate about a Z axis perpendicular to the Y direction and the X direction. In some embodiments, the head 110 is rotatable between a first position and a second position 90 degrees from the first position with respect to the head conveyance frame 120. The head can be in the first position when traveling in the X direction and in the second position when travelling in the Y direction such that it is oriented to cut masking material in either direction. FIGS. 5-7 depict the head oriented to cut strips of masking material in the Y direction, and FIGS. 8-10 show the cutting head oriented to cut strips of masking material in the X direction. As shown in comparison of FIGS. 5-7 to FIGS. 8-10, the cutting had has been rotated 90 degrees. Further, FIGS. 11-15 show various views of the head oriented to cut strips in the Y direction, and FIGS. 16-19 show various views of the head oriented to cut strips in the X direction. In the embodiment shown in FIGS. 11-15, the head 110 includes an attachment flange 150 useful for attaching the head to the vertical beam 130. In such embodiments, the head is rotatable with respect to the attachment flange. Comparing FIGS. 11, 12, and 14 to FIGS. 16, 17, and 19, respectively, demonstrates cutting head 110 rotating 90 degrees with respect to the attachment flange 150.

In addition, certain embodiments of the machine 50 include a linear actuator that allows the head 110, or components thereof, to move along the Z axis towards and away from the rear support and a glazing pane positioned thereon. Such movement allows the head to selectively engage and disengage with masking material applied to the glazing pane to cut and remove it from the glazing pane as described herein. As shown in FIGS. 11, 13, and 16, one or more optional bumper rollers 154 can be provided at a desired location along the Z axis to roll along the surface of the masking material during a cutting operation and physically prevent the head 110 from moving along the Z axis to close to the glazing pane.

Accordingly, in some embodiments, the head (or components thereof) 110 is moveable toward and away from the platen or other rear support 80 of the machine along a Z axis, is rotatable about the Z axis, and can move linearly along a X axis and Y axis of the machine 50. Such a machine 50 allows the head 110 to automatically cut and remove strips of masking material in a grid pattern to create unmasked strips on the glazing pane such that muntin bars can be applied to a surface of the glazing pane in the region of the unmasked strips without contacting masking material and masking material can remain to protect the portions of the glazing pane that are not in contact with the muntin bars.

The cutting head 110 can include any type of cutter operable to cut masking material from the glazing pane. In some embodiments, such as shown in FIGS. 11 and 16, the cutting head includes two spaced-apart cutters 160, 162 to cut strips of masking material from the glazing pane. The cutting head can be adjustable between a first configuration and a second configuration. In some embodiments, when the cutting head is in the first configuration, as shown in FIG. 16, the two spaced-apart cutters are operable to make two respective cuts, elongated in the X direction, in a masking film on the first surface of the glazing pane to thereby cut a strip from the masking film. And when the cutting head is in the second configuration, as shown in FIG. 11, the two spaced-apart cutters are operable to make two respective cuts, elongated in the Y direction, in the masking film on the first surface of the glazing pane to thereby cut a strip from such masking film. As shown, the cutting head and cutters can be operable to rotate 90 degrees about a Z axis that is perpendicular to the first surface. Further, the cutters can be actuated to extend or retract along the Z axis to selectively engage or disengage the masking material.

The cutters 160, 162 can be of any style useful for cutting the strips of masking. As shown in FIG. 11, in some embodiments, the two spaced-apart cutters are two cutting wheels rotatably mounted to the head 110. Various views of such a cutting wheel are provided in FIGS. 20-22. As shown, the cutting wheels can each be a circular planar member rotatably coupled to a flange 164 connected to the head by an axle 166 and having a cutting edge 168 along its circumference. In such embodiments, the cutting edges can be placed into physical contact with the masking material, and as the head is moved the cutting wheels will rotate and roll across the masking material making parallel cuts as they roll. In some embodiments, each cutting wheel is adapted to cut through all or substantially all of the thickness of the masking material without marking the underlying glass to which the masking material is applied. In certain embodiments, the cutting wheels cut through the entire thickness of the masking material and roll directly against the glass surface as the head is moved and the cutting wheels roll. In embodiments where the masking material overlaps, the cutting wheels can supply sufficient cutting pressure such that two overlapped layers of masking material are cut. In some embodiments, the cutting pressure is between about 3 to about 6 pounds (e.g., between about 4 to about 5.5 pounds). In certain embodiments a cutting edge of the cutting wheel is between about 0.005 inches and about 0.02 inches thick (e.g., about 0.01 and about 0.015 inches thick).

In some embodiments, the two cutting wheels each have a diameter of at least 2 inches (e.g., between about 2 and about 3 inches, such as about 2.3 inches), and are spaced apart between about 0.5 inches and about 3 inches (e.g., about 2 inches). In some embodiments, the cutting wheels are spaced at a distance slightly wider (e.g., between 1 and 10% wider) than the width of a muntin bar that will be applied to the glazing pane in the area from which the strip of masking material was removed. Such a greater spacing helps to ensure edges of masking material do not get inadvertently pinched between the muntin bar and the pane, which could make the masking material more difficult to remove.

Accordingly, the cutters 160, 162 mounted to the head 110 are useful for cutting strips of masking material applied to a glazing pane. When strips are cut in both the X direction and the Y direction, the strips can intersect each other. Further, multiple intersecting strips can be cut such that they define a grid pattern bounding at least four rectangles of masking film remaining on the first surface of the glazing pane.

Embodiments of the machine 50 can also be adapted to facilitate removal of the strips of masking material after they are cut. As shown in FIGS. 11 and 16, some embodiments of the machine include an abrasion tool 180 carried by the head 110. The abrasion tool abrades the masking material to make it easier to remove from the glazing pane after it has been cut. A closer view of an embodiment of the abrasion tool 180 can be seen in FIG. 23. In the embodiment shown, the abrasion tool includes a knurl tool, which can take the form of a circular planar member rotatably mounted to the head and having a knurling edge 184 along its circumference. As shown, the knurling edge can include a serious of protruding edges along the circumference. In some embodiments, the protruding edges are skewed relative to an axis about which the knurl tool rolls. In such embodiments, the knurling edge can be placed into physical contact with the masking material, and as the head is moved the knurling tool will rotate and roll across the masking material knurling the masking material as it rolls. The cutting head and abrasion tool can be operable to rotate 90 degrees about a Z axis that is perpendicular to the first surface. Further, the abrasion tool can be actuated to extend or retract along the Z axis to selectively engage or disengage the masking material, optionally along with the cutters. The knurl tool can have a diameter of between about 0.3 inches and about 0.8 inches (e.g., about 0.5 inches).

As shown in FIGS. 11 and 16, in some embodiments the abrasion tool 180 is located between the two cutting wheels 160, 162 and is operative to abrade the masking film in a location between the two respective cuts. The two cutters 160, 162 and the tool 180 can be located on the cutting head 110, the tool being positioned such that when the cutting head is moved along the masking film on the first surface of the glazing pane to cut a strip from the masking film, the two cutters are positioned ahead of the tool.

Figure 25:
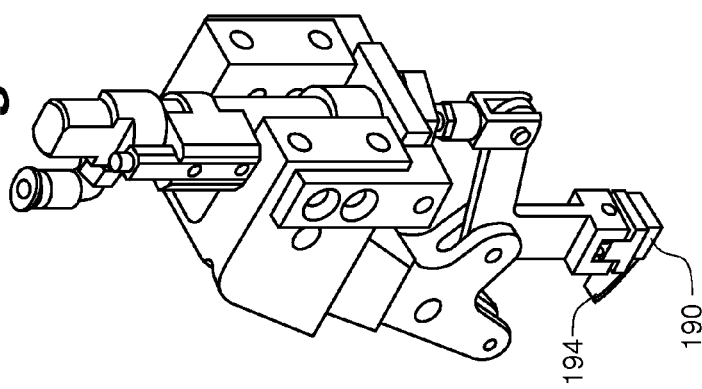
FIG. 25 is a rear perspective view of a claw in accordance with certain embodiments of the present invention.
Figure 24:
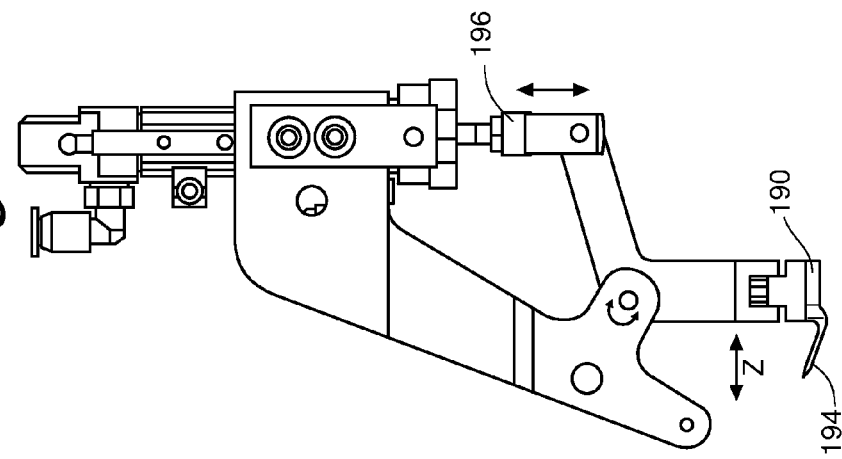
FIG. 24 is a side view of a claw in accordance with certain embodiments of the present invention.
Figure 23:
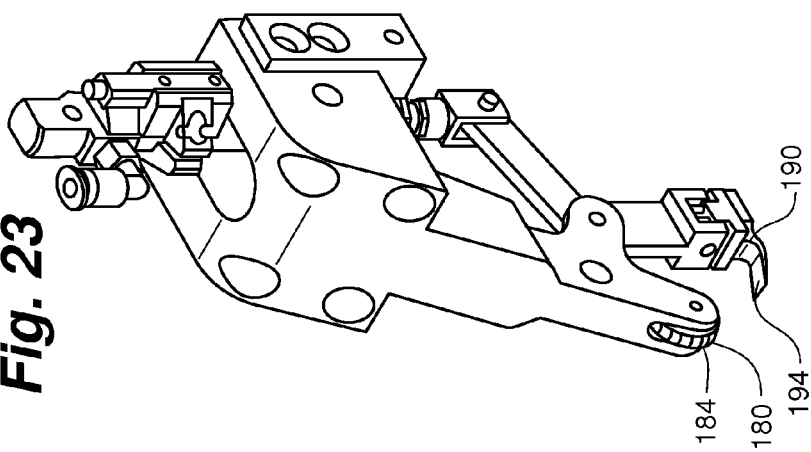
FIG. 23 is a front perspective view of a claw in accordance with certain embodiments of the present invention.

Some embodiments of the machine 50 include a cutting head with a claw constructed to lift an edge region of the masking film away from the first surface of the glazing pane. An embodiment of a claw 190 is shown in FIGS. 23-25. An abrasion tool 180 is also depicted in FIG. 23 to illustrate an exemplary position of the claw 190 on the head. Such a claw can be useful to facilitate removal of the strip of masking material after it has been cut. The claw can include an extending member 194 to engage the cut strip at an edge. As shown in FIG. 24, the extending member 194 can extend at a skewed angle (e.g., between about 25 and about 50 degrees) relative to the Z axis to help it engage and lift an edge of the masking material.

The claw 190 can be operable to rotate along with the head 90 degrees about a Z axis that is perpendicular to the first surface. In some embodiments, the claw is further independently movable in a Z direction, the Z direction being orthogonal to both the X and Y directions, such that the claw is movable toward and away from the glazing pane independently of the movement of the head and other components such as the cutters and abrasion tool (in embodiments having such components). In certain embodiments, the claw is moved toward the glazing pane at a beginning of a cutting operation to engage an edge of the cut masking material, and is moved away from the glazing pane after engaging the edge of the cut masking material. In certain embodiments, the claw is engaged for between about 0.5 inches and about 1 inch (e.g., about 0.825 inches) of travel of the cutting operation. In some embodiments, as shown in FIG. 24, an actuator is used to move the claw toward and away from the glazing pane. In the embodiment shown, an electronic actuator moves extends a rod 196, which is pivotably coupled to the claw 190. As the rod extends the claw pivots such that its extending member moves toward or away from the glazing assembly as programmed.

In the embodiment shown, the claw 190 is located on a trailing portion of the cutting head. In such an embodiment, when the cutting head is moved along the masking film on the first surface of the glazing pane to cut a strip from the masking film, the two cutters and the abrasion tool are positioned ahead of the claw.

Embodiments of the machine 50 can also include at least one nozzle oriented to deliver a gas stream (e.g., an air stream) toward an edge region of masking film. An embodiment with two nozzles 210, 212 is shown, for example, in FIGS. 11 and 16. The gas stream is operable to promote disengagement of the cut strip of masking material from the glazing pane. In some embodiments, the nozzle is positioned at a skewed angle relative to the Z axis to help the gas stream act against the glazing pane and the cut masking strip to promote disengagement of the cut masking strip from the glazing pane. In the embodiment shown, the machine includes a first nozzle 210 and a second nozzle 212. The first nozzle can be positioned ahead of the second nozzle in a direction of travel during a cutting operation. Both nozzles can be positioned at a skewed angle relative to the Z axis such that a gas stream exiting the nozzle interacts with cut masking material at a skewed angle. In some embodiments, each nozzle is positioned at a different skewed angle. In certain embodiments, the first nozzle is positioned at a larger angle than the second nozzle. In the embodiment shown, the first nozzle is positioned at an angle of about 45 degrees with respect to the glass and the second nozzle is positioned at an angle of about 35 degrees with respect to the glass. The nozzles can be operated under any suitable conditions, and in some embodiments the gas is air at a pressure of between about 75 pounds per square inch and about 150 pounds per square inch (e.g., about 100 pounds per square inch) and can exit the nozzle with a velocity of between about 400 and about 450 feet/second (e.g. a velocity of about 436 feet/second). The nozzle can be operable to rotate along with the head 90 degrees about a Z axis that is perpendicular to the rear support and glazing pane. Further, in some embodiments the nozzle can be actuated to extend or retract along the Z axis to adjust the distance between it and the rear support and glazing pane.

In some embodiments, the two cutters, the claw, and the at least one nozzle can be located on the cutting head. The claw can be positioned between the two cutters and the nozzle, such that when the cutting head is moved along the masking film on the first surface of the glazing pane to cut a strip from the masking film, the two cutters are positioned ahead of the claw. And the claw can be positioned ahead of the nozzle. In some embodiments, the nozzle delivers a gas stream continuously during a cutting operation. In certain embodiments, the nozzle delivers a gas stream during an engagement of a claw with an edge region of a cut strip of masking material to further promote disengagement of the strip of cut masking material from the glazing pane.

Figure 27:
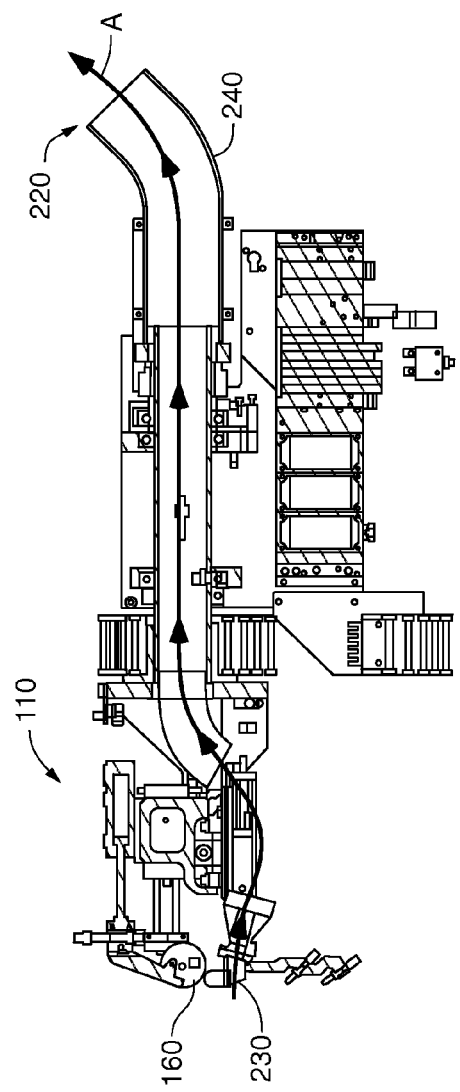
FIG. 27 is a side-section view of a head with a vacuum system depicting section A-A of FIG. 26.
Figure 26:
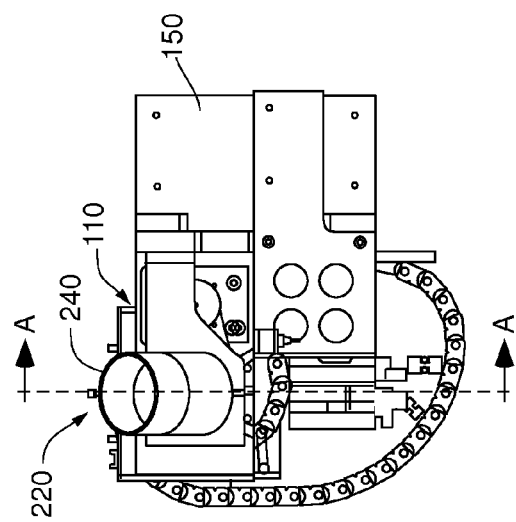
FIG. 26 is an end view of a head with a vacuum system in accordance with certain embodiments of the present invention.

Embodiments of the machine 50 can also include a vacuum system 220 to remove the strips of cut masking material. FIGS. 5 and 8 depict a vacuum system, and FIGS. 26 and 27 focus on the vacuum components associated with the cutting head 110. Note that optional flexible hosing is not depicted in the Figures. In some embodiments, the vacuum includes a vacuum intake 230 and an elongated vacuum line 240. The vacuum intake can receive strips cut from the masking film by the cutting head, and the elongated vacuum line carries the strips away from the cutting head generally along the pathway of arrow "A" depicted in FIG. 27. The vacuum intake may be on the cutting head such that it is proximate to the material being cut. As shown, the vacuum intake 230 positioned within the cutting head 110, such that cut material travels through a portion of the head. Accordingly, in this embodiment the vacuum intake can be operable to rotate along with the head 90 degrees about a Z axis that is perpendicular to the glazing pane and rear support. In the specific embodiment shown, the vacuum intake 230 is located behind the cutters and the abrasion tool, such that when the cutting head is moved along the masking film on the first surface of the glazing pane to cut a strip from the masking film, the two cutters and the abrasion tool are positioned ahead of the vacuum intake.

As shown in FIGS. 5 and 8, the elongated vacuum line 240 may be in fluid communication with the vacuum intake and may carry the cut strips toward a housing 250 that houses a motor for producing the vacuum. The housing may be positioned above a strip storage area 260 such that cut strips drawn toward the housing will drop into the container, the contents of which can be periodically removed. In some embodiments the line has an internal diameter of between about 2 inches and about 3 inches (e.g., about 2.37 inches) at the intake and increases to between about 3 inches and about 4 inches (e.g., about 3.882 inches) at the housing. In certain embodiments, the vacuum strength is between about 4 and about 9 inches of water column. Such a vacuum system is useful for removing masking strips having a width of up to about 2.5 inches, which makes it particularly useful for removing strips cut prior to the placement of muntin bars.

The machine can be configured to automatically remove strips of masking material from a glazing pane. As such, the conveyance system, head, head conveyance frame, cutters, abrasion tool, nozzle, and vacuum, and the various actuators and motors associated therewith, may all be connected to a programmable process controller having a user interface.

Embodiments of the invention also include automated methods of removing strips of masking film from masked glazing panes using a machine, such as an embodiment of a machine described herein. In some embodiments, the method includes positioning a glazing pane having opposed first and second surfaces in a processing position wherein the first surface of the glazing pane is oriented toward a cutting head. Some embodiments of the method include operating a conveyor to move a glazing pane along a lateral axis of the machine and operating a suction device(s) to secure the glazing pane in a processing position while moving a cutting head relative to the glazing pane.

Embodiments of the method can include moving the cutting head in either a X direction or a Y direction along the first surface of the glazing pane such that two spaced-apart cutters make two respective cuts, elongated in either the X direction or the Y direction, in a masking film on the first surface of the glazing pane to thereby cut a strip from the masking film.

A specific embodiment of the method can includes moving a cutting head in the Y direction along a first surface of a glazing pane such that two spaced-apart cutters make two respective cuts, elongated in the Y direction, in the masking film on the first surface of the glazing pane to thereby cut a first strip from the masking film. And moving the cutting head in the X direction along the first surface of the glazing pane such that the two spaced-apart cutters make two respective cuts, elongated in the X direction, in the masking film on the first surface of the glazing pane to thereby cut a second strip from the masking film. In some embodiments the method includes moving the cutting head vertically along the vertical beam, and moving the cutting head horizontally by moving the vertical beam horizontally along the two horizontal beams.

Embodiments of the method can also include rotating the cutting head between first and second configurations, such that when the cutting head is in the first configuration the two spaced-apart cutters are operable to make two respective cuts, elongated in the X direction, in the masking film on the first surface of the glazing pane to thereby cut a strip from the masking film. And when the cutting head is in the second configuration the two spaced-apart cutters are operable to make two respective cuts, elongated in the Y direction, in the masking film on the first surface of the glazing pane to thereby cut a strip from such masking film.

In an exemplary operation, the cutting head is positioned near an edge of the glazing unit and a first vertical strip of masking material is cut and removed. The cutting head can then be moved laterally across the sheet until it reaches a location where a second vertical strip of masking material is to be cut and removed. The head can proceed in this manner cutting the vertical strips of masking material in series until all vertical strips have been cut and removed. The head can then be rotated 90 degrees and moved vertically to a desired position to cut a first horizontal strip. The cutting head can then be moved vertically until it reaches a location where a second vertical strip of masking material is to be cut and removed. The head can proceed in this matter cutting horizontal strips of masking material in series until all horizontal strips have been cut and removed.

In some embodiments, the method includes operating an abrasion tool to roughen the masking film in a location between two cuts. In embodiments where the abrasion tool includes a knurl tool, the method can include operating the knurl tool to knurl the masking film in the location between the two cuts.

Embodiments of the method can also include operating a claw to lift an edge region of the masking film away from the first surface of the glazing pane, the edge region being located between the two cuts and defining an end of the strip. In a specific embodiment, the method includes moving the claw toward the glazing pane prior to lifting the edge region of the masking film away from the first surface of the glazing pane, and moving the claw away from the glazing pane after lifting the edge region of the masking film away from the first surface of the glazing pane.

The method can also include operating a nozzle to deliver a gas (e.g., air) stream toward the edge region of the masking film. In embodiments having two cutters, a claw, and the nozzle located on a cutting head, the claw can be positioned between the two cutters and the nozzle. In such embodiments, while moving the cutting head along the masking film on the first surface of the glazing pane the two cutters will be ahead of the claw, and the claw will be ahead of the nozzle.

Some embodiments of the method include operating a vacuum such that a vacuum intake receives a strip cut from the masking film by the cutting head, and an elongated vacuum line carries the strip away from the cutting head, and optional delivers it to a storage container.

While some preferred embodiments of the invention have been described, it should be understood that various changes, adaptations and modifications may be made therein without departing from the spirit of the invention and the scope of the appended claims.

What is claimed is:

1. A machine for automated removal of strips of masking film from a masked glazing pane, comprising a cutting head and a processing station, the processing station constructed to retain a glazing pane having opposed first and second surfaces in a processing position wherein the first surface of the glazing pane is oriented toward the cutting head, the cutting head being movable in an X direction and in a Y direction, the X and Y directions being offset from each other by an angle of 90 degrees, the cutting head having two spaced-apart cutters, the cutting head being adjustable between a first configuration and a second configuration, such that when the cutting head is in the first configuration the two spaced-apart cutters are operable to make two respective cuts, elongated in the X direction, in a masking film on the first surface of the glazing pane to thereby cut a strip from the masking film, and when the cutting head is in the second configuration the two spaced-apart cutters are operable to make two respective cuts, elongated in the Y direction, in the masking film on the first surface of the glazing pane to thereby cut a strip from such masking film, wherein the two spaced-apart cutters are two cutting wheels.

2. The machine of claim 1 wherein the machine further comprises a vacuum having a vacuum intake and an elongated vacuum line, the vacuum constructed such that: (i) the vacuum intake receives strips cut from the masking film by the cutting head, and (ii) the elongated vacuum line carries the strips away from the cutting head.

3. The machine of claim 2 wherein the vacuum intake is located on the cutting head, and the elongated vacuum line extends from the cutting head to a strip storage area.

4. The machine of claim 1 comprising a vertical beam and two horizontal beams, the cutting head mounted so as to be moveable vertically along the vertical beam, and the vertical beam mounted so as to be moveable horizontally along the two horizontal beams.

5. A machine for automated removal of strips of masking film from a masked glazing pane, comprising a cutting head and a processing station, the processing station constructed to retain a glazing pane having opposed first and second surfaces in a processing position wherein the first surface of the glazing pane is oriented toward the cutting head, the cutting head being movable in an X direction and in a Y direction, the X and Y directions being offset from each other by an angle of 90 degrees, the cutting head having two spaced-apart cutters, the cutting head being adjustable between a first configuration and a second configuration, such that when the cutting head is in the first configuration the two spaced-apart cutters are operable to make two respective cuts, elongated in the X direction, in a masking film on the first surface of the glazing pane to thereby cut a strip from the masking film, and when the cutting head is in the second configuration the two spaced-apart cutters are operable to make two respective cuts, elongated in the Y direction, in the masking film on the first surface of the glazing pane to thereby cut a strip from such masking film, the machine comprising an upright platen constructed to support the second surface of the glazing pane, and a conveyor adjacent a bottom region of the upright platen, the conveyor constructed to support a bottom edge of the glazing pane.

6. The machine of claim 5 wherein the upright platen has one or more suction devices operable to retain the glazing pane in the processing position while the cutting head moves relative to the glazing pane.

7. The machine of claim 1 wherein the cutting head is rotatable between the first and second configurations.

8. The machine of claim 1 wherein the two cutting wheels each have a diameter of at least two inches.

9. A machine for automated removal of strips of masking film from a masked glazing pane, comprising a cutting head and a processing station, the processing station constructed to retain a glazing pane having opposed first and second surfaces in a processing position wherein the first surface of the glazing pane is oriented toward the cutting head, the cutting head being movable in an X direction and in a Y direction, the X and Y directions being offset from each other by an angle of 90 degrees, the cutting head having two spaced-apart cutters, the cutting head being adjustable between a first configuration and a second configuration, such that when the cutting head is in the first configuration the two spaced-apart cutters are operable to make two respective cuts, elongated in the X direction, in a masking film on the first surface of the glazing pane to thereby cut a strip from the masking film, and when the cutting head is in the second configuration the two spaced-apart cutters are operable to make two respective cuts, elongated in the Y direction, in the masking film on the first surface of the glazing pane to thereby cut a strip from such masking film, wherein the cutting head further comprises a claw constructed to lift an edge region of the masking film away from the first surface of the glazing pane.

10. The machine of claim 9 wherein the claw is movable in a Z direction, the Z direction being orthogonal to both the X and Y directions, such that the claw is movable toward and away from the glazing pane.

11. The machine of claim 9 wherein the two cutters are located on a leading portion of the cutting head, and the claw is located on a trailing portion of the cutting head, such that when the cutting head is moved along the masking film on the first surface of the glazing pane to cut a strip from the masking film, the two cutters are positioned ahead of the claw.

12. The machine of claim 9 further comprising a nozzle oriented to deliver a gas stream toward the edge region of the masking film.

13. The machine of claim 12 wherein the two cutters, the claw, and the nozzle are located on the cutting head, the claw being positioned between the two cutters and the nozzle, such that when the cutting head is moved along the masking film on the first surface of the glazing pane to cut a strip from the masking film, the two cutters are positioned ahead of the claw, and the claw is positioned ahead of the nozzle.

14. A machine for automated removal of strips of masking film from a masked glazing pane, comprising a cutting head and a processing station, the processing station constructed to retain a glazing pane having opposed first and second surfaces in a processing position wherein the first surface of the glazing pane is oriented toward the cutting head, the cutting head being movable in an X direction and in a Y direction, the X and Y directions being offset from each other by an angle of 90 degrees, the cutting head having two spaced-apart cutters, the cutting head being adjustable between a first configuration and a second configuration, such that when the cutting head is in the first configuration the two spaced-apart cutters are operable to make two respective cuts, elongated in the X direction, in a masking film on the first surface of the glazing pane to thereby cut a strip from the masking film, and when the cutting head is in the second configuration the two spaced-apart cutters are operable to make two respective cuts, elongated in the Y direction, in the masking film on the first surface of the glazing pane to thereby cut a strip from such masking film, the machine comprising a knurl tool located between the two spaced-apart cutters, the knurl tool being operable to knurl the masking film in a location between the two respective cuts elongated in the X direction, when the cutting head is in the first configuration or between the two respective cuts, elongated in the Y direction, when the cutting head is in the second configuration.

15. The machine of claim 5 wherein the machine further comprises a vacuum having a vacuum intake and an elongated vacuum line, the vacuum constructed such that: (i) the vacuum intake receives strips cut from the masking film by the cutting head, and (ii) the elongated vacuum line carries the strips away from the cutting head.

16. The machine of claim 15 wherein the vacuum intake is located on the cutting head, and the elongated vacuum line extends from the cutting head to a strip storage area.

17. The machine of claim 5 comprising a vertical beam and two horizontal beams, the cutting head mounted so as to be moveable vertically along the vertical beam, and the vertical beam mounted so as to be moveable horizontally along the two horizontal beams.

18. The machine of claim 5 wherein the two spaced-apart cutters are two cutting wheels.

19. The machine of claim 18 wherein the two cutting wheels each have a diameter of at least two inches.

20. The machine of claim 5 wherein the cutting head further comprises a claw constructed to lift an edge region of the masking film away from the first surface of the glazing pane.

21. The machine of claim 20 wherein the claw is movable in a Z direction, the Z direction being orthogonal to both the X and Y directions, such that the claw is movable toward and away from the glazing pane.

22. The machine of claim 20 wherein the two cutters are located on a leading portion of the cutting head, and the claw is located on a trailing portion of the cutting head, such that when the cutting head is moved along the masking film on the first surface of the glazing pane to cut a strip from the masking film, the two cutters are positioned ahead of the claw.

23. The machine of claim 20 further comprising a nozzle oriented to deliver a gas stream toward the edge region of the masking film.

24. The machine of claim 23 wherein the two cutters, the claw, and the nozzle are located on the cutting head, the claw being positioned between the two cutters and the nozzle, such that when the cutting head is moved along the masking film on the first surface of the glazing pane to cut a strip from the masking film, the two cutters are positioned ahead of the claw, and the claw is positioned ahead of the nozzle.

25. The machine of claim 5 further comprising a knurl tool located between the two spaced-apart cutters, the knurl tool being operable to knurl the masking film in a location between the two respective cuts, elongated in the X direction, when the cutting head is in the first configuration or between the two respective cuts, elongated in the Y direction, when the cutting head is in the second configuration.

26. The machine of claim 9 wherein the machine further comprises a vacuum having a vacuum intake and an elongated vacuum line, the vacuum constructed such that: (i) the vacuum intake receives strips cut from the masking film by the cutting head, and (ii) the elongated vacuum line carries the strips away from the cutting head.

27. The machine of claim 26 wherein the vacuum intake is located on the cutting head, and the elongated vacuum line extends from the cutting head to a strip storage area.

28. The machine of claim 9 comprising a vertical beam and two horizontal beams, the cutting head mounted so as to be moveable vertically along the vertical beam, and the vertical beam mounted so as to be moveable horizontally along the two horizontal beams.

29. The machine of claim 9 wherein the two spaced-apart cutters are two cutting wheels.

30. The machine of claim 29 wherein the two cutting wheels each have a diameter of at least two inches.

31. The machine of claim 9 further comprising a knurl tool located between the two spaced-apart cutters, the knurl tool being operable to knurl the masking film in a location between the two respective cuts, elongated in the X direction, when the cutting head is in the first configuration or between the two respective cuts, elongated in the Y direction, when the cutting head is in the second configuration.

32. The machine of claim 14 wherein the machine further comprises a vacuum having a vacuum intake and an elongated vacuum line, the vacuum constructed such that: (i) the vacuum intake receives strips cut from the masking film by the cutting head, and (ii) the elongated vacuum line carries the strips away from the cutting head.

33. The machine of claim 32 wherein the vacuum intake is located on the cutting head, and the elongated vacuum line extends from the cutting head to a strip storage area.

34. The machine of claim 14 comprising a vertical beam and two horizontal beams, the cutting head mounted so as to be moveable vertically along the vertical beam, and the vertical beam mounted so as to be moveable horizontally along the two horizontal beams.

35. The machine of claim 14 wherein the two spaced-apart cutters are two cutting wheels.

36. The machine of claim 35 wherein the two cutting wheels each have a diameter of at least two inches.

\* \* \* \* \*